US010798273B2

(12) United States Patent
Song

(10) Patent No.: US 10,798,273 B2
(45) Date of Patent: Oct. 6, 2020

(54) PARKING GUIDANCE CAMERA APPARATUS AND METHOD OF INSTALLING THE SAME

(71) Applicant: IDIS CO., LTD., Daejeon-si (KR)

(72) Inventor: Jin Kyu Song, Seoul (KR)

(73) Assignee: IDIS CO., LTD., Daejeon-si (KR)

( * ) Notice: Subject to any disclaimer, the term of this patent is extended or adjusted under 35 U.S.C. 154(b) by 0 days.

(21) Appl. No.: 16/276,651

(22) Filed: Feb. 15, 2019

(65) Prior Publication Data

US 2019/0297231 A1    Sep. 26, 2019

(30) Foreign Application Priority Data

Mar. 22, 2018  (KR) .................. 10-2018-0033392
Mar. 22, 2018  (KR) .................. 10-2018-0033393

(51) Int. Cl.
*H04N 5/225* (2006.01)
*H04N 5/232* (2006.01)
*H04N 5/247* (2006.01)
*G08G 1/14* (2006.01)

(52) U.S. Cl.
CPC ............. *H04N 5/2252* (2013.01); *G08G 1/14* (2013.01); *H04N 5/2253* (2013.01); *H04N 5/23299* (2018.08); *H04N 5/247* (2013.01)

(58) Field of Classification Search
None
See application file for complete search history.

(56) References Cited

U.S. PATENT DOCUMENTS

| 2016/0148762 A1* | 5/2016 | Chichy | H02B 13/0356 348/376 |
| 2016/0150947 A1* | 6/2016 | Marmor | A61B 1/00103 600/110 |
| 2016/0191813 A1* | 6/2016 | Wu | H04N 5/2252 348/159 |
| 2017/0205687 A1* | 7/2017 | Mitchell | F16M 11/2057 |

FOREIGN PATENT DOCUMENTS

| KR | 10-0834409 B1 | 6/2008 | |
| KR | 20-2011-0000523 U | 1/2011 | |
| KR | 10-1729655 B1 | 5/2017 | |
| WO | WO-2009045056 A2 * | 4/2009 | ......... F16M 11/2014 |

OTHER PUBLICATIONS

Office Action dated May 9, 2019 for Korean Application No. 10-2018-0033392.
Office Action dated May 9, 2019 for Korean Application No. 10-2018-0033393.

* cited by examiner

*Primary Examiner* — Edemio Navas, Jr.

(57) ABSTRACT

A parking guidance camera apparatus is provided. An elastic pad of a pan tilt gimbal is in close contact with or separated from a lower surface of a pan tilt camera module in a main body housing to fix or release the tilt camera module. An outer portion of an operation lever is hinge-coupled to a holder to be vertically tilted in a state in which the elastic pad is seated on an upper surface of the outer portion of the operation lever in the main body housing. An upper portion of a fixing knob is screw-coupled to an inner portion of the operation lever to vertically tilt the operation lever according to a rotating direction thereof so that the elastic pad is in close contact with or separated from the pan tilt camera module.

6 Claims, 10 Drawing Sheets

PARKING GUIDANCE CAMERA APPARATUS AND METHOD OF INSTALLING THE SAME

CROSS-REFERENCE TO RELATED APPLICATION

This application claims priority to and the benefit of Korean Registered Patent No. 10-2018-0033392, filed on Mar. 22, 2018, and Korean Registered Patent No. 10-2018-0033393, filed on Mar. 22, 2018, the disclosure of which is incorporated herein by reference in its entirety.

BACKGROUND

1. Field

The present disclosure relates to a camera apparatus, and more specifically, to a camera apparatus used for parking guidance.

2. Description of Related Art

Since the number of vehicles is increasing, a shortage of parking spaces is becoming a social issue. Particularly, a large building such as a department store, a superstore, an apartment, a hospital, or the like in which a plurality of vehicles frequently enter and exit has a problem with parking spaces even despite often having a multilayer parking space.

A large parking lot is formed of a plurality of parking surfaces (parking blocks) and a passage, and a driver can be inconvenienced while driving through the passage and finding the empty parking surface one by one to park in the parking lot. Although a method of disposing manpower in a parking lot to guide and show entry of vehicles is used, recently, a system in which an available parking area and entering vehicles are monitored and parking is guided is also suggested.

As an example, the parking guidance system uses a plurality of camera apparatuses installed in a ceiling of the parking lot. Meanwhile, the camera apparatus can be configured to manually adjust a photographing angle of a camera module according to an installation environment of the parking lot on the basis of a camera main body in a state of being installed in the parking lot, and in this case, installation convenience of the camera apparatus should be improved.

For example, according to a conventional camera apparatus, a camera module is supported by a camera main body at an adjustable angle and fixed by a gimbal in a state in which the angle is adjusted. Here, in the gimbal, an operation part configured to fix the camera module is located in the camera main body. Accordingly, a process of adjusting and fixing a photographing angle of the camera module will be described below.

First, a worker goes through processes of closing the inside of the camera main body using a cover after fixing the camera module by operating the operation part of the gimbal in a state in which the cover of the camera main body is removed to open the inside of the camera main body and the angle of the camera module is adjusted. As described above, since a process of fixing the camera module in a state in which the photographing angle of the camera module is adjusted is inconvenient, the installation convenience of the camera apparatus has many issues.

SUMMARY

The present disclosure relates to a parking guidance camera apparatus and a method of installing the same capable of enhancing the installation convenience.

In one general aspect, a parking guidance camera apparatus according to the present disclosure includes a camera main body, a parking guidance light, and an installation bracket. The camera main body includes a main body housing, a pan tilt camera module partially inserted into a camera mounting hole of the main body housing, a holder configured to support the pan tilt camera module on the main body housing so that the pan tilt camera module is laterally panned and vertically tilted, and a pan tilt gimbal configured to fix the pan tilt camera module in a state in which a panning angle and a tilting angle of the pan tilt camera module are adjusted. The parking guidance light is detachably attached to a lower portion of the main body housing. The installation bracket is provided to install the camera main body at a set location in a parking lot. The pan tilt gimbal includes an elastic pad, an operation lever, and a fixing knob. The elastic pad fixes or releases the pan tilt camera module as the elastic pad is in close contact with or separated from a lower surface of the pan tilt camera module in a state of facing the lower surface of the pan tilt camera module in the main body housing. An outer portion of the operation lever is hinge-coupled to the holder to be vertically tilted in a state in which the elastic pad is seated on an upper surface of the outer portion of the operation lever in the main body housing. An upper portion of the fixing knob is screw-coupled to an inner portion of the operation lever to vertically tilt the operation lever according to a rotating direction thereof so that the elastic pad is in close contact with or separated from the pan tilt camera module, and a lower end portion is covered by the parking guidance light in a state of being exposed to a lower portion of the main body housing.

Further, the camera main body may further include at least one tilt camera module supported by the main body housing to be vertically tilted in a state of being partially inserted into a camera mounting hole of the main body housing, and a tilt gimbal configured to fix the tilt camera module in a state in which a tilting angle of the tilt camera module is adjusted. Here, the tilt gimbal may include an elastic block configured to fix or release the tilt camera module as the elastic block is in close contact with or separated from a lower surface of the tilt camera module in a state of facing the lower surface of the tilt camera module in the main body housing, an elevation block supported by the main body housing to be elevated in a state in which the elastic block is seated, and a fixing knob having an upper portion screw-coupled to the elevation block to elevate the elevation block according to a rotating direction thereof so that the elastic block is in close contact with or separated from, the tilt camera module, and having a lower end portion covered by the parking guidance light in a state of being exposed to the lower portion of the main body housing.

In another general aspect, a method of installing a parking guidance camera apparatus according to the present disclosure includes installing an installation bracket at a set location of a parking lot and taking out a connection cable, engaging a camera main body with the installation bracket through a working cable of the installation bracket, connecting the connection cable to the camera main body, mounting the camera main body on the installation bracket, connecting an external monitor to a monitor connection port of the camera main body, allowing an elastic pad be in close contact with a pan tilt camera module to fix the pan tilt camera module by rotating a fixing knob exposed to a lower portion of the camera main body to tilt an operation lever in an upward direction with respect to a holder after adjusting a panning angle and a tilting angle of the pan tilt camera module supported by the holder of the camera main body to be laterally panned and vertically tilted on the basis of image information provided through the external monitor, binding a parking guidance light to the camera main body through a safety wire and connecting the parking guidance light to the camera main body through a connector, and attaching the parking guidance light to the lower portion of the camera main body using a magnetic force in a state in which the parking guidance is covered by the fixing knob.

Further, the method may further include fixing a tilt camera module after connecting the external monitor by rotating a fixing knob exposed to the lower portion of the camera main body to raise an elastic block after adjusting a tilting angle of the tilt camera module supported by the camera main body to be vertically tilted on the basis of the image information provided through the external monitor.

Figure 1:
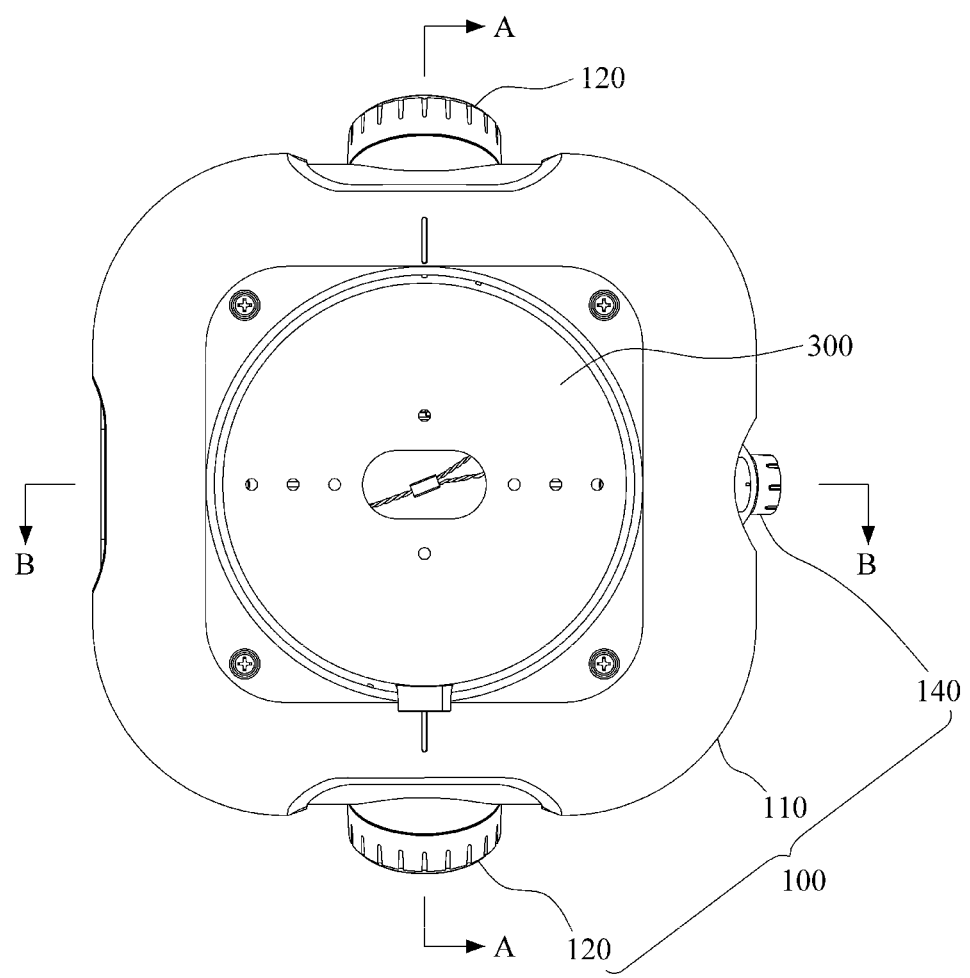
FIG. 1 is a plan view of a parking guidance camera apparatus according to an embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present disclosure will be described below in detail with reference to the accompanying drawings. Here, the same reference numerals are used for the same components in the description, and repeated descriptions and a detailed description for known functions and configurations which may unnecessarily obscure the spirit of the present disclosure will be omitted. Embodiments of the present disclosure are provided to more completely describe the present disclosure to those skilled in the art. Accordingly, a shape, a size and the like of elements in the drawings may be exaggerated for more clear description.

Figure 2:
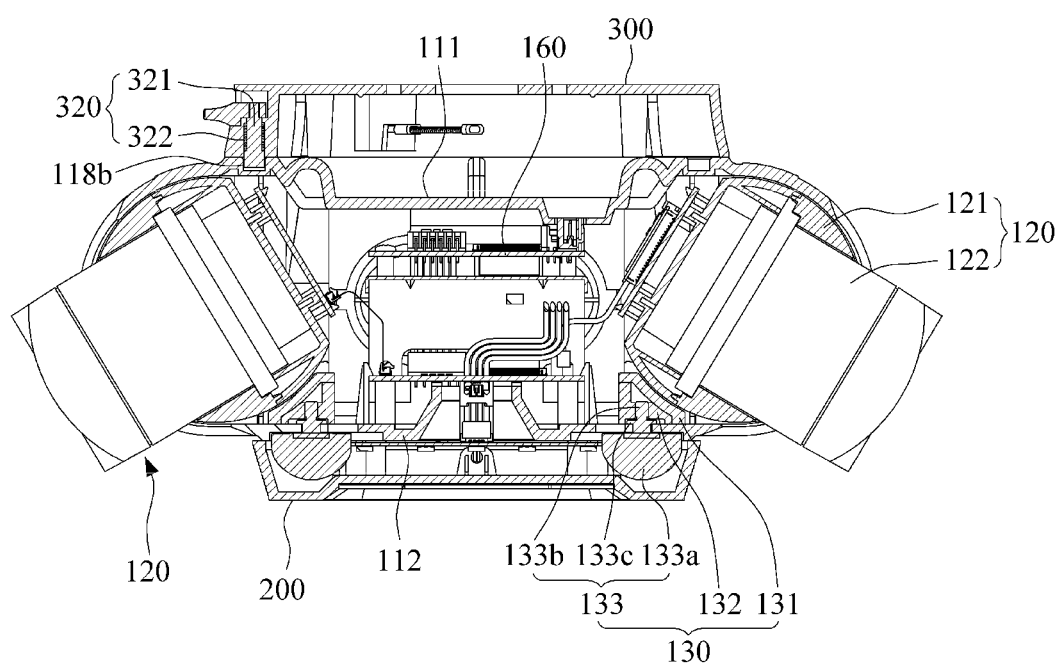
FIG. 2 is a cross-sectional view cut along line A-A in FIG. 1.
Figure 3:
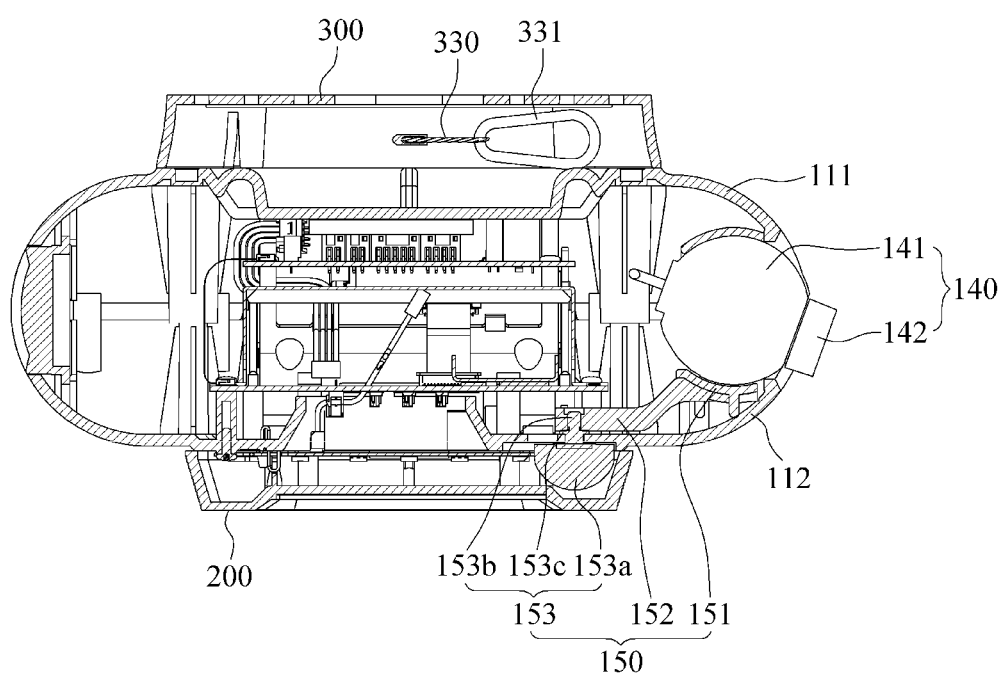
FIG. 3 is a cross-sectional view cut along line B-B in FIG. 1.
Figure 4:
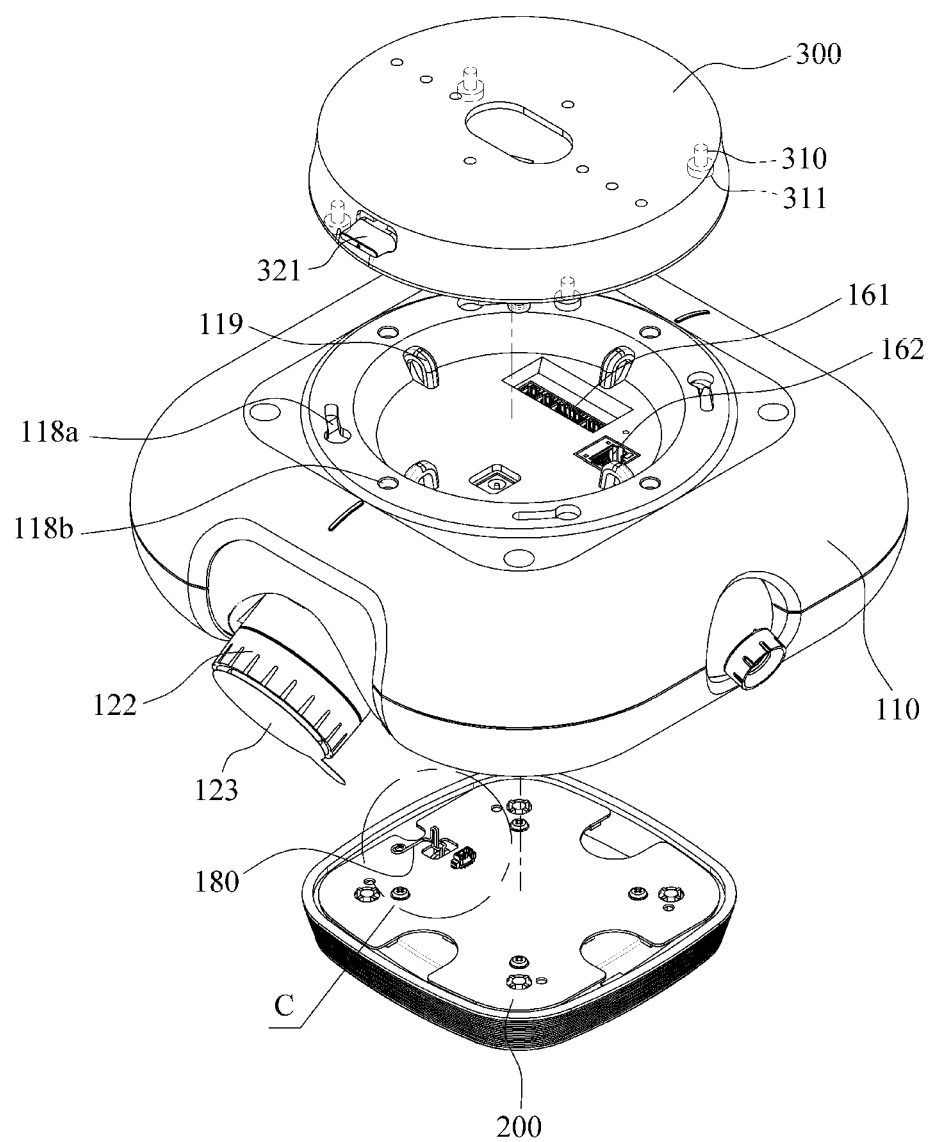
FIG. 4 is an exploded perspective view of FIG. 1.
Figure 5:
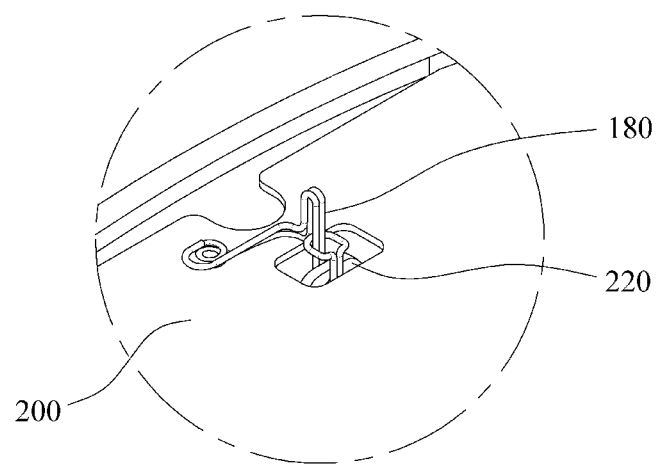
FIG. 5 is an enlarged perspective view of area C in FIG. 4.
Figure 6:
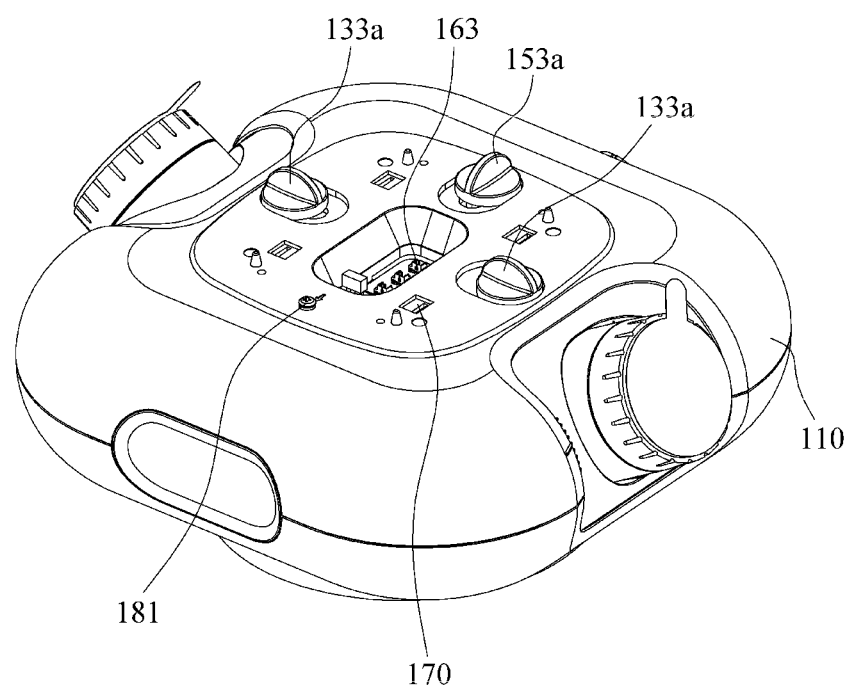
FIG. 6 is a bottom view of a camera main body.
Figure 7:
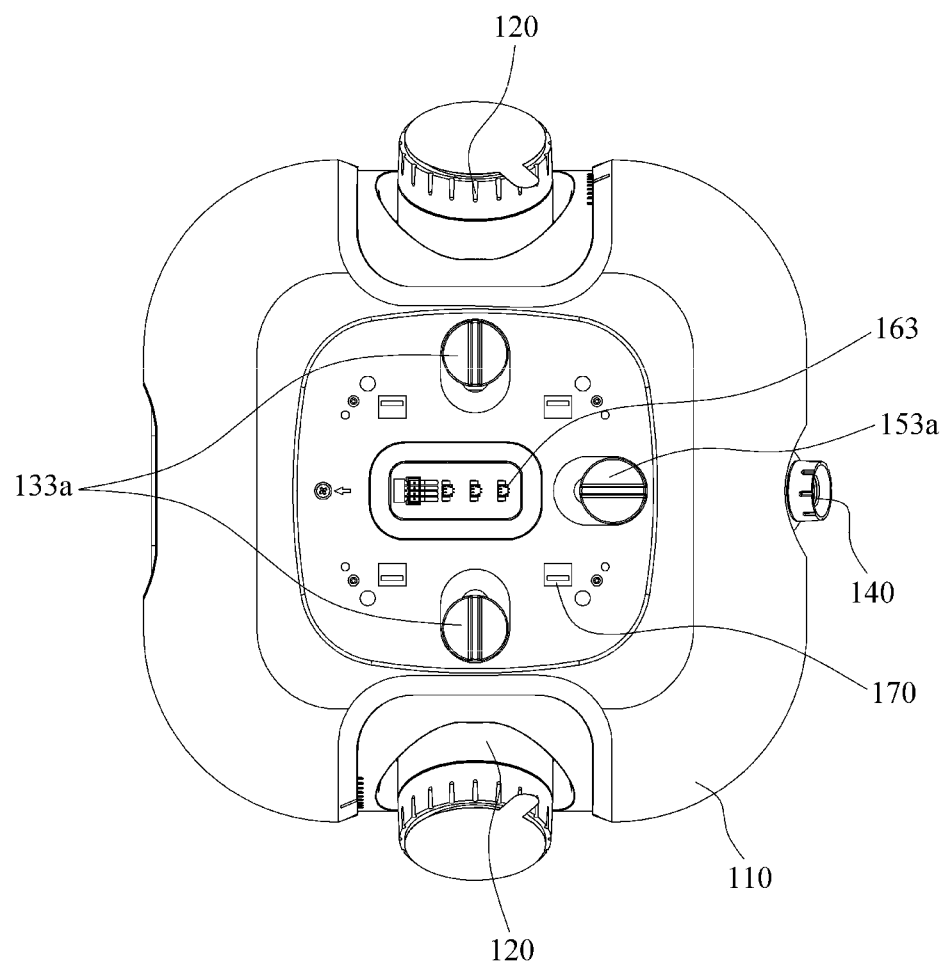
FIG. 7 is a perspective view of the camera main body viewed from below.
Figure 8:
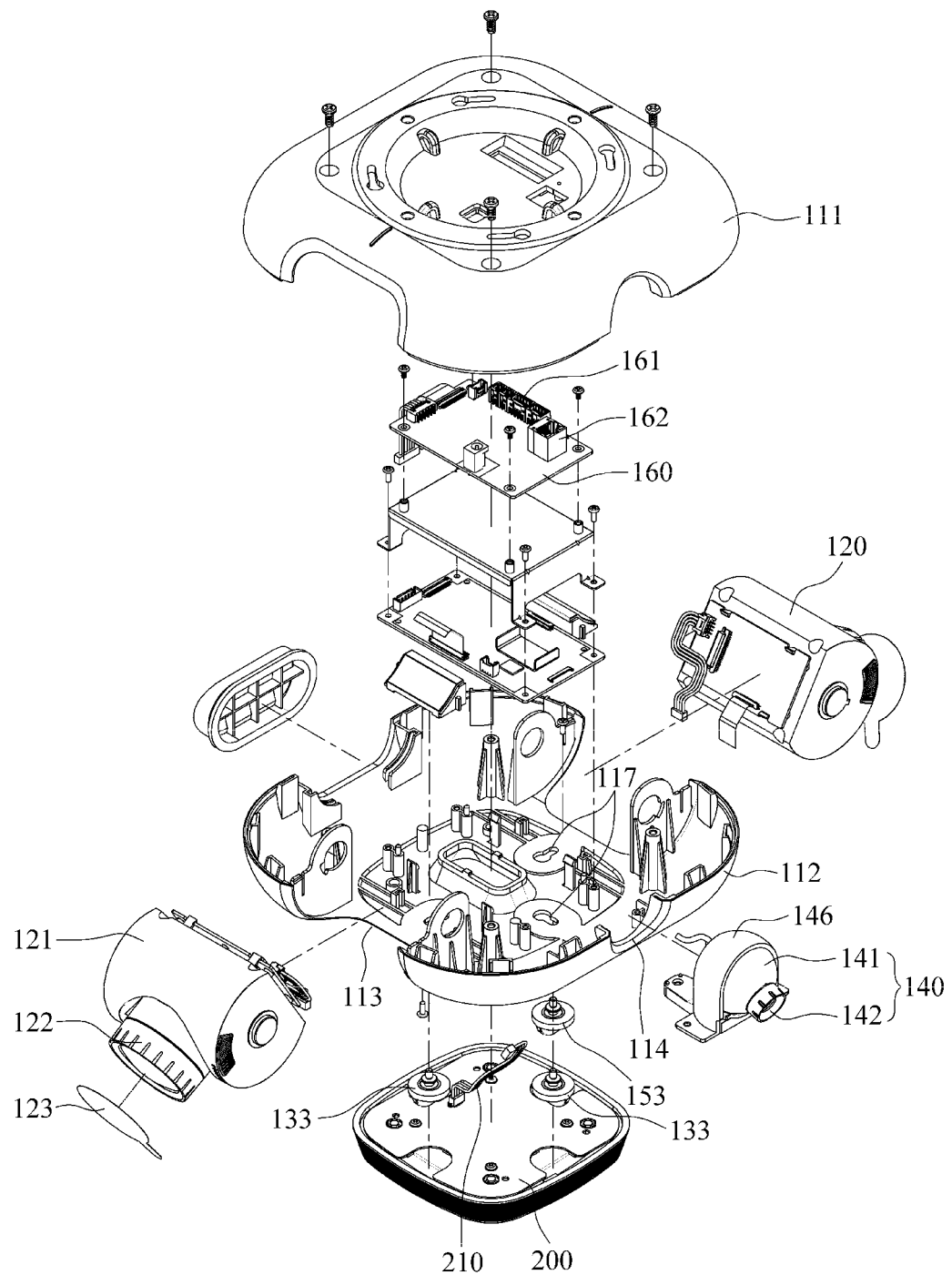
FIG. 8 is an exploded perspective view of the camera main body.

FIG. 1 is a plan view of a parking guidance camera apparatus according to an embodiment of the present disclosure. FIG. 2 is a cross-sectional view cut along line A-A in FIG. 1. FIG. 3 is a cross-sectional view cut along line B-B in FIG. 1. FIG. 4 is an exploded perspective view of FIG. 1. FIG. 5 is an enlarged perspective view of area C in FIG. 4. FIG. 6 is a bottom view of a camera main body. FIG. 7 is a perspective view of the camera main body viewed from below. FIG. 8 is an exploded perspective view of the camera main body.

Referring to FIGS. 1 to 8, the parking guidance camera apparatus according to an embodiment of the present disclosure includes a camera main body 100, a parking guidance light 200, and an installation bracket 300.

The camera main body 100 includes a main body housing 110, a pan tilt camera module 140, and a pan tilt gimbal 150. The main body housing 110 may include an upper housing 111 and a lower housing 112 which may be assembled to and disassembled from each other. Accordingly, the main body housing 110 may allow inner components to be easily assembled or disassembled.

At least one printed circuit board 160 may be mounted in the main body housing 110. The printed circuit board 160 may receive an external power signal and a control signal to output the external power signal and the control signal to the pan tilt camera module 140 and the parking guidance light 200 and may receive an image signal photographed from the pan tilt camera module 140 to output the image signal to the outside.

When the camera main body 100 includes at least one tilt camera module 120, the printed circuit board 160 may receive the external power signal and the control signal to output the external power signal and the control signal to the tilt camera module 120 and may receive an image signal photographed from the tilt camera module 120 to output the image signal to the outside.

The printed circuit board 160 may include terminals to be connected to the tilt camera module 120, the pan tilt camera module 140, and the parking guidance light 200. A power input port 161 and a communication port 162 may be mounted on the printed circuit board 160 and exposed through an upper portion of the main body housing 110. That is, openings may be formed in a center of an upper surface of the main body housing 110 to expose the power input port 161 and the communication port 162 therethrough.

Further, at least one monitor connection port 163 may be mounted on the printed circuit board 160 and exposed from a lower portion of the main body housing 110. That is, openings may be formed in a center of a lower surface of the main body housing 110 to expose the monitor connection port 163 therethrough. The number of monitor connection ports 163 may be provided according to the number of tilt camera modules 120 and pan tilt camera modules 140.

The monitor connection ports 163 are connected to an external monitor so that image information photographed from the tilt camera modules 120 and the pan tilt camera modules 140 may be output to the external monitor. A worker may adjust a tilting angle of the tilt camera module 120 and a pan angle and a tilting angle of the pan tilt camera module 140 on the basis of the image information provided through the external monitor.

The main body housing 110 has camera mounting holes 113 and 114 in side surfaces thereof. For example, when the camera main body 100 includes a pair of tilt camera modules 120 and one pan tilt camera module 140, the main body housing 110 has the camera mounting holes 113 in two side surfaces facing each other among four side surfaces thereof to partially accommodate the tilt camera modules 120 and has the camera mounting hole 114 in another one side surface to accommodate the pan tilt camera module 140. The camera mounting holes 113 and 114 may be configured according to a shape of each of the tilt camera modules 120 and the pan tilt camera module 140.

The pan tilt camera module 140 is partially inserted into the camera mounting hole 114 of the main body housing 110. The pan tilt camera module 140 may be laterally panned and vertically tilted by a holder 146 according to an installation environment of a parking lot, and a photographing angle of the pan tilt camera module 140 may be adjusted. The pan tilt camera module 140 photographs a corresponding area in real time so that the photographed image information is provided to a parking guidance managing server or the like through wired and wireless communications.

The pan tilt camera module 140 includes a lens forming an optical image of a subject and includes an image sensor configured to convert the optical image formed by the lens to an electrical signal. The pan tilt camera module 140 may include a casing 141 configured to embed the image sensor therein, and a lens barrel 142 on which the lens is mounted. The casing 141 may be formed in a spherical shape. The lens barrel 142 may be connected to the casing 141 in a protruding shape. The holder 146 may be supported by the main body housing 110 to be capable of laterally panning and vertically tilting the pan tilt camera module 140.

Figure 9:
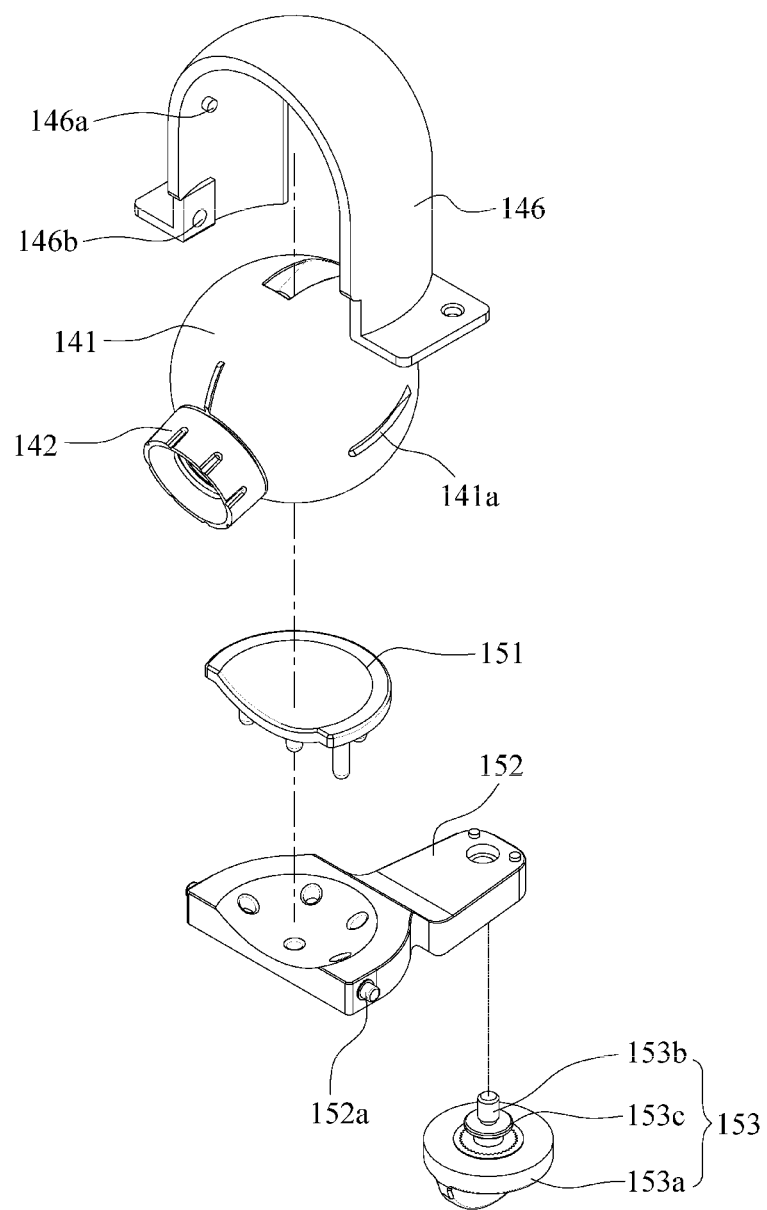
FIG. 9 is an exploded perspective view illustrating a pan tilt camera module and a pan tilt gimbal extracted on the basis of FIG. 8.

Referring to FIGS. 8 and 9, an upper portion of the holder 146 may be formed to be curved in curvature the same as that of the casing 141 and a lower portion may surround the casing 141 in an open shape. The holder 146 may have a lower portion bolted in the main body housing 110 to be fixed. The holder 146 includes a support protrusion 146a on each of both inner side surfaces thereof. The casing 141 may have support grooves 141a elongated in frontward and backward directions on the basis of the lens barrel 142 in both side surfaces thereof. The support protrusions 146a are fitted into the support grooves 141a to support lateral panning and vertical tilting of the casing 141. Accordingly, the pan tilt camera module 140 may be supported to be laterally panned and vertically tilted on the basis of the main body housing 110.

The pan tilt gimbal 150 fixes the pan tilt camera module 140 in a state in which the pan angle and the tilting angle of the pan tilt camera module 140 are adjusted. The pan tilt gimbal 150 includes an elastic pad 151, an operation lever 152, and a fixing knob 153. The elastic pad 151 fixes or releases the pan tilt camera module 140 as it is in close contact with or separated from a lower surface of the pan tilt camera module 140 in a state of facing the lower surface of the pan tilt camera module 140 in the main body housing 110. The elastic pad 151 may be in close contact with the casing 141 in an elastically transformed state to tightly fix the pan tilt camera module 140. Accordingly, a situation in which the pan tilt camera module 140 is twisted in a panning direction or a tilting direction by slight vibrations of a parking lot building, shaking of a raceway on which the parking guidance camera apparatus 100 is mounted, a shock, or the like may be prevented. The elastic pad 151 may be formed of a material such as rubber or the like.

The elastic pad 151 may have a shape having an upper portion concavely curved along a curved surface of the casing 141 of the pan tilt camera module 140 and may be in close contact with the casing 141 without a gap to further improve a fixing effect of the pan tilt camera module 140. The upper portion of the elastic pad 151 may be inclined to be close to the inside of the casing 141 of the pan tilt camera module 140. Accordingly, the elastic pad 151 may move from the inside of the main body housing 110 to the outside and may be located to face the casing 141 of the pan tilt camera module 140 at a predetermined interval when initially mounted.

An outer portion of the operation lever 152 is hinge-coupled to the holder 146 to be vertically tilted in a state in which the elastic pad 151 is seated on an upper surface of the outer portion in the main body housing 110. The operation lever 152 has a hinge shaft 152a, and the holder 146 has a hinge groove 146b. In the operation lever 152, since the portion hinge-coupled the holder 146 is located nearer to the outside than a center of the elastic pad 151, the elastic pad 151 may be more efficiently in contact with or released from the casing 141 of the pan tilt camera module 140 when vertically tilted.

The operation lever 152 may be coupled to the elastic pad 151 in a concavo-convex structure or may be integrated with the elastic pad 151 by bonding or the like. The operation lever 152 has a screw groove screw-coupled to the fixing knob 153 therein. In the operation lever 152, an inner portion is elevated according to a rotating direction of the fixing knob 153 to be vertically tilted on the basis of a hinge-coupling shaft between the holder 146 and the outer portion.

In the fixing knob 153, since a center screw part is screw-coupled to the lower surface of the main body housing 110 and an upper end portion is elevated according to a rotating direction to elevate the inner portion of the operation lever 152, the elastic pad 151 is in close contact with or separated from the pan tilt camera module 140 by vertical tilting of the operation lever 152, and a lower end head portion is covered by the parking guidance light 200 in a state of being exposed to the lower portion of the main body housing 110.

That is, the fixing knob 153 has a head 153a formed on one end thereof and a screw part 153b screw-coupled to the operation lever 152 on the other end thereof. Since the head 153a of the fixing knob 153 is formed in a structure having a center portion configured to protrude in a fan shape, the worker may hold the head 153a with fingers thereof and easily rotate the head 153a.

In the fixing knob 153, the screw part 153b may be inserted into and screw-coupled to the operation lever 152 from the lower portion of the main body housing 110 through an engaging hole 117 of the main body housing 110 in a state in which the head 153a faces in a downward direction. The fixing knob 153 may have a ring-shaped protrusion 153c having a diameter greater than that of the screw part 153b on the center portion thereof.

In this case, the engaging hole 117 of the main body housing 110 may be formed in a shape configured to allow the ring-shaped protrusion 153c to be engaged with an outer portion thereof, which has a relatively small size, after the ring-shaped protrusion 153c of the fixing knob 153 passes through an inner portion thereof. Accordingly, the fixing knob 153 may not be downwardly separated from the main body housing 110 even when separated from the operation lever 152 in a state of being engaged with the engaging hole 117 by the ring-shaped protrusion 153c.

In the fixing knob 153, since a lower end portion, that is, the head 153a, is exposed to the lower portion of the main body housing 110, the worker raises or lowers the inner portion of the operation lever 152 by rotationally operating the head 153a of the fixing knob 153, and thus the elastic pad 151 may be in close contact with or separated from the pan tilt camera module 140. Accordingly, since the worker may easily fix or release the pan tilt camera module 140, having the pan angle and the tilting angle are adjusted, from the outside of the main body housing 110 without disassembling the main body housing 110, installation convenience may be improved. Further, since the head 153*a* of the fixing knob 153 is covered and concealed by the parking guidance light 200 after the pan angle and the tilting angle of the pan tilt camera module 140 are adjusted, an exterior appearance thereof may be enhanced.

The parking guidance light 200 visually shows a situation of the parking lot using light. For example, the parking guidance light 200 may show green light in an empty lot state in which the parking lot has an available parking area and may show red light in a full lot state in which the parking lot does not have the available parking area. The parking guidance light 200 may be formed of a light emitting diode (LED) parking guidance light. In the parking guidance light 200, a lower portion may have a light emitting portion therein and an upper portion may be attached to the main body housing 110. The parking guidance light 200 may be connected to the printed circuit board 160 of the camera main body 100 through the connector 210. The parking guidance light 200 may be controlled by receiving a control signal output from a parking guidance managing server or the like according to the situation of the parking lot through the camera main body 100.

The parking guidance light 200 is configured to be attachable to or detachable from the lower portion of the main body housing 110. For example, the parking guidance light 200 may be attached to the main body housing 110 by a magnetic force. Accordingly, the worker may allow the parking guidance light 200 to be conveniently attached to or detached from the main body housing 110. A permanent magnet 170 may be mounted on the main body housing 110. The parking guidance light 200 may include a magnetic body such as iron or the like which attach to the permanent magnet 170. For another example, when engaging bolts which attach to the permanent magnet 170 are mounted on the parking guidance light 200, the permanent magnet 170 may be mounted on the main body housing 110 to correspond to the engaging bolts. Further, the permanent magnet 170 may be mounted on the parking guidance light 200.

A safety wire 180 may bind the parking guidance light 200 to the main body housing 110. Accordingly, since the parking guidance light 200 is attached to the main body housing 110 by the magnetic force in a state of being bound to the main body housing 110 by the safety wire 180, a risk of falling of the parking guidance light 200 may be prevented. Further, since the worker may connect the parking guidance light 200 to the camera main body 100 in a state of being engaged with the main body housing 110 by the safety wire 180, working convenience may be improved. For example, the safety wire 180 may be bound to a safety wire bolt 181 on the lower surface of the main body housing 110 in a state of being wound around a ring 220 at an upper portion of the parking guidance light 200. Of course, the safety wire 180 is not limited to the exemplified embodiments and may be variously configured.

The installation bracket 300 is provided to install the camera main body 100 at a set location of the parking lot. The installation bracket 300 may be fixed to a ceiling of the parking lot by bolting or the like. The installation bracket 300 may be installed on a raceway or the like of the ceiling. The installation bracket 300 may function as a junction box. The installation bracket 300 may take out a connection cable of each of a power cable, a communication cable, and the like through a lower opening thereof.

A mounting structure between the installation bracket 300 and the camera main body 100 will be described below. A plurality of engaging protrusions 310 are formed on a lower surface of the installation bracket 300 in a circumferential direction. Each of the engaging protrusions 310 may be formed in a shape having a protrusion head 311 having a cross-sectional area greater than that of a protrusion body on a lower end of the protrusion body configured to protrude from the lower surface of the installation bracket 300. The main body housing 110 includes engaging holes 118*a* at which the engaging protrusions 310 are fitted and engaged in the upper surface thereof. Each of the engaging holes 118*a* is formed in a shape capable of allowing the protrusion head 311 of the engaging protrusion 310 to pass through one portion thereof and then allowing the protrusion head 311 to be engaged with the other portion thereof according to lateral movement.

Accordingly, since the worker rotates the main body housing 110 in a lateral direction in a state in which the engaging protrusions 310 of the installation bracket 300 passes through the engaging holes 118*a* of the main body housing 110, the engaging protrusions 310 may be mounted on the installation bracket 300 in an engaging method. Here, the main body housing 110 may be locked on the installation bracket 300 by a locking device 320 so that the main body housing 110 is not rotated in the lateral direction in a state of being engaged with the installation bracket 300.

The locking device 320 may include a latch 321 and a spring 322. The latch 321 may be supported to be elevated in the installation bracket 300. An upper portion of the latch 321 is taken out through a side surface opening of the installation bracket 300. The spring 322 applies an elastic force to the latch 321 in a downward direction. The main body housing 110 has a locking groove 118*b* into which a lower portion of the latch 321 is fitted in a state in which the main body housing 110 rotates to the set location to be engaged with the installation bracket 300.

When the worker rotates the main body housing 110 in the lateral direction in a state where the engaging protrusions 310 of the installation bracket 300 are passed through the engaging holes 118*a* of the main body housing 110, the latch 321 is pushed by the upper surface of the main body housing 110 and ascends. In this case, the spring 322 is elastically transformed. In this state, when the main body housing 110 rotates to the set location to be engaged with the installation bracket 300, the latch 321 descends due to an elastic force of the spring 322 and is fitted into the locking groove 118*b*. Accordingly, the main body housing 110 may be locked so as not to rotate in the lateral direction in the state of being engaged with the installation bracket 300.

In this state, when the worker rotates the main body housing 110 to a location in which the engaging protrusions 310 may be separated from the engaging holes 118*a* after raising the upper portion of the latch 321 using fingers thereof, the main body housing 110 may be separated from the installation bracket 300.

The camera main body 100 may include at least one ring 119 on the main body housing 110. Further, the installation bracket 300 may include a working cable 330 engaged with the ring 119 through a hook 331 in one end thereof to hang and hold the camera main body 100 thereon. Accordingly, since the worker may connect the connection cable of the installation bracket 300 to the camera main body 100 in a state in which the camera main body 100 is engaged with the installation bracket 300 by the working cable 330, the working convenience may be improved.

Since a plurality of rings 119 are arranged in the main body housing 110 at a predetermined interval in a circumferential direction, the worker may conveniently engage the hook 331 of the working cable 330 with the corresponding ring 119 according to a working location. The hook 331 of the working cable 330 may be configured to maintain a state in which one portion thereof is closed by an elastic force. The hook 331 may be formed of a conventional configuration. Accordingly, the hook 331 may be stably maintained in a state of being engaged with the ring 119.

Meanwhile, the camera main body 100 may further include at least one tilt camera module 120 and the tilt gimbal 130.

The tilt camera module 120 may be supported by the body housing 110 to be vertically tilted in a state of being partially inserted into the camera mounting hole 113 of the main body housing 110. Accordingly, the tilt camera module 120 may be vertically tilted according to the installation environment of the parking lot, and a photographing angle of the tilt camera module 120 may be adjusted. The tilt camera module 120 photographs a corresponding area in the parking lot in real time so that the photographed image information is provided to the parking guidance managing server or the like through the wired and wireless communications.

The tilt camera module 120 may include a lens forming an optical image of a subject and an image sensor configured to convert the optical image formed by the lens to an electrical signal. Further, the tilt camera module 120 may include a casing 121 configured to embed the image sensor therein and a lens barrel 122 on which the lens is mounted. The casing 121 may be formed in a cylindrical shape cut in a longitudinal direction to have a cross-sectional area greater than a half-circle cross-sectional area. The lens barrel 122 may be connected to a center of a curved surface of the casing 121. A lens cover 123 may be attachable to or detachable from the lens barrel 122.

Figure 10:
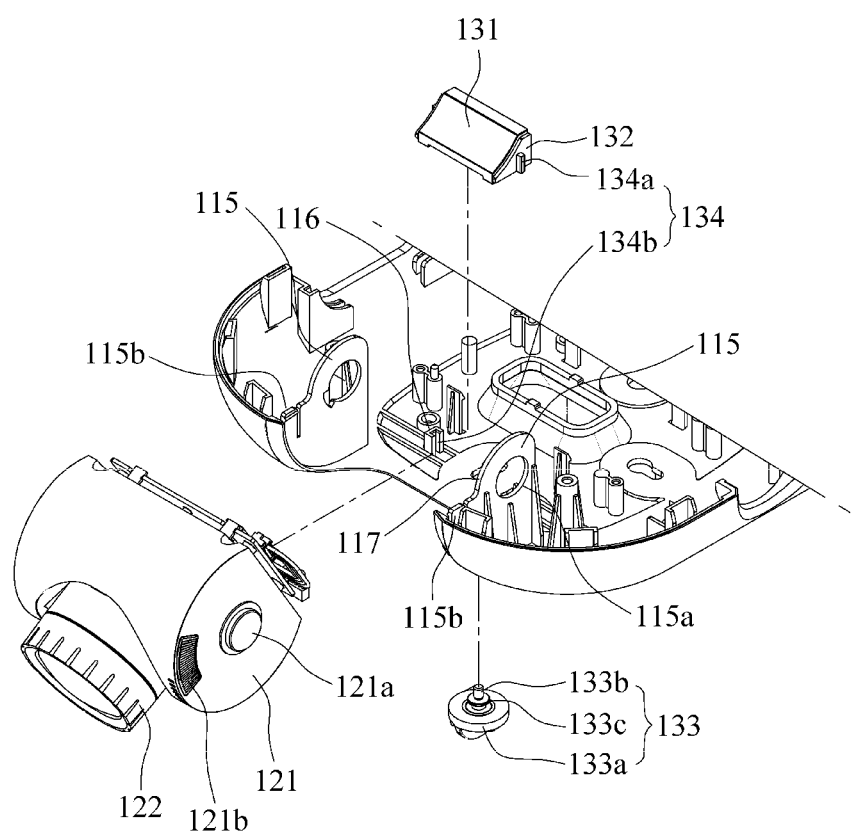
FIG. 10 is an exploded perspective view illustrating a tilt camera module and a tilt gimbal extracted on the basis of FIG. 8.

Referring to FIGS. 8 and 10, the casing 121 may include hinge protrusions 121a on both side surfaces thereof. In the main body housing 110, hinge pieces 115 facing both side surfaces of the casing 121 may be formed around the camera mounting hole 113. Each of the hinge pieces 115 has a hinge hole 115a. The hinge protrusions 121a are fitted into the hinge holes 115a to support vertical tilting of the casing 121. Accordingly, the tilt camera module 120 may be supported to be vertically tilted on the basis of the main body housing 110.

In the casing 121, fixing grooves 121b may be formed at a predetermined pitch on at least one side surface along a circumferential direction. The hinge pieces 115 may include fixing protrusions 115b corresponding to some of the fixing grooves 121b of the casing 121. The fixing protrusion 115b is fitted into the facing fixing groove 121b among the fixing grooves 121b along a tilting angle of the casing 121. Accordingly, the tilt camera module 120 may be temporarily fixed in a state in which an angle thereof is adjusted, and the worker may feel a click sensation when the tilting angle of the tilt camera module 120 is adjusted.

The fixing protrusions 115b may be incised in a downward direction from both sides of an upper end and connected to the hinge pieces 115. The fixing protrusions 115b may be easily bent around portions connected to the hinge pieces 115 and thus may easily move between the fixing grooves 121b when the casing 121 is vertically tilted.

The tilt gimbal 130 fixes the tilt camera module 120 in the state in which the tilting angle of the tilt camera module 120 is adjusted. The tilt gimbal 130 includes an elastic block 131, an elevation block 132, and a fixing knob 133.

The elastic block 131 fixes or releases the tilt camera module 120 as it is in close contact with or separated from a lower surface of the tilt camera module 120 in a state of facing the lower surface of the tilt camera module 120 in the main body housing 110. The elastic block 131 may be in close contact with the casing 121 in an elastically transformed state to tightly fix the tilt camera module 120. Accordingly, a situation in which the tilt camera module 120 is twisted in a tilting direction by slight vibrations of the parking lot building, shaking of the raceway on which the parking guidance camera apparatus is mounted, shock, or the like may be prevented. The elastic block 131 may be formed of a material such as rubber or the like.

The elastic block 131 may have a shape having an upper portion concavely curved along a curved surface of the casing 121 of the tilt camera module 120 and may be in close contact with the casing 121 without a gap to further improve a fixing effect of the tilt camera module 120. The upper portion of the elastic block 131 may be inclined to be close to the inside of the casing 121 of the tilt camera module 120. Accordingly, when initially mounted, the elastic block 131 may move from the inside of the main body housing 110 to the outside and may be located to face the casing 121 of the tilt camera module 120 at a predetermined interval.

The elevation block 132 is supported by the main body housing 110 to be elevated in a state in which the elastic block 131 is seated. The elevation block 132 may be coupled to the elastic block 131 in a concavo-convex structure or may be integrated with the elastic block 131 by bonding or the like. The elevation block 132 has a screw groove screw-coupled to the fixing knob 133 at a lower portion thereof.

The elevation block 132 may be elevated by an elevation guide 134 to be guided to the main body housing 110. The elevation guide 134 may include guide protrusions 134a formed on both side surfaces of the elevation block 132. The main body housing 110 may include guide pieces 116 each facing the guide protrusions 134a.

Each of the guide pieces 116 may have a guide groove 134b for guiding elevation with the guide protrusion 134a fitted thereinto. Accordingly, the elevation block 132 may be elevated and guided by the guide protrusions 134a and the guide grooves 134b without lateral rotation. As another example, the guide protrusions 134a may be formed on the guide pieces 116, and the guide grooves 134b may be formed in the elevation block 132.

An upper portion of the fixing knob 133 is screw-coupled to the elevation block 132 to elevate the elevation block 132 according to a rotating direction thereof so that the elastic block 131 is in close contact with or separated from the tilt camera module 120, and a lower end portion of the fixing knob 133 is exposed to the lower portion of the main body housing 110. The fixing knob 133 is covered by the parking guidance light 200 in a state in which the lower end portion thereof is exposed to the lower portion of the main body housing 110.

The fixing knob 133 may be configured to be identical to the fixing knob 153 of the pan tilt gimbal 150. The fixing knob 133 may have a head 133a formed in one end thereof, a screw part 133b screw-coupled to the elevation block 132 in the other end thereof, and a ring-shaped protrusion 133c having a diameter greater than that of the screw part 133b in a center portion thereof.

As described above, in the fixing knob 133, since a lower end portion, that is, the head 133a is exposed to the lower portion of the main body housing 110, the worker may raise or lower the elevation block 132 by rotationally operating the head 133a of the fixing knob 133 so that the elastic block 131 may be in close contact with or separated from the tilt camera module 120.

Accordingly, since the worker may easily fix or release the tilt camera module 120 having the tilting angle adjusted from the outside of the main body housing 110 without disassembling the main body housing 110, installation convenience may be improved. Further, since the head 133a of the fixing knob 133 is covered and concealed by the parking guidance light 200 after the tilting angle of the tilt camera module 120 is adjusted, an exterior appearance thereof may be enhanced.

When a pair of tilt camera modules 120 are provided and disposed at both sides of the main body housing 110, a pair of tilt gimbals 130 may be provided to fix the tilt camera modules 120 in a state in which a tilting angle of each of the tilt camera modules 120 is adjusted.

An example of a method of installing the above-described parking guidance camera apparatus in the parking lot will be described below.

First, the worker installs the installation bracket 300 at the set location of the parking lot and takes out the connection cable. For example, the installation bracket 300 may be bolted and installed on the ceiling of the parking lot, and the connection cable may be taken out through a lower opening of the installation bracket 300.

Further, the camera main body 100 is hung on the installation bracket 300 by the working cable 330 of the installation bracket 300. In this case, the hook 331 of the working cable 330 is engaged with the ring 119 of the camera main body 100 to hang and hold the camera main body 100. Further, the connection cable is connected to the camera main body 100. In this case, the connection cable is connected to the power input port 161 and the communication port 162 exposed to an upper portion of the camera main body 100.

In addition, the camera main body 100 is mounted on the installation bracket 300. In this case, the camera main body 100 is rotated to the set location in a lateral direction to be engaged with the installation bracket 300 after the engaging protrusions 310 of the installation bracket 300 are passed through the engaging holes 118a of the camera main body 100. In addition, the latch 321 of the installation bracket 300 is fitted into the locking groove 118b of the camera main body 100 by the spring 322 to be completely mounted thereon.

In addition, the external monitor is connected to the monitor connection port 163 of the camera main body 100. In this case, the external monitor is connected to a monitor connection port for a pan tilt camera module 140 exposed through the lower portion of the camera main body 100. Further, since the fixing knob 153 of the pan tilt gimbal 150 exposed to the lower portion of the camera main body 100 is rotated and the operation lever 152 is tilted in an upward direction with respect to the holder 146 after adjusting the panning angle and the tilting angle of the pan tilt camera module 140 supported by the holder 146 of the camera main body 100 to be laterally panned and vertically tilted on the basis of the image information provided through the external monitor, the elastic pad 151 is in close contact with the pan tilt camera module 140 to fix the pan tilt camera module 140.

When the tilting angle of the tilt camera module 120 is desired to be adjusted, the external monitor is connected to a monitor connection port for a tilt camera module. Further, since the fixing knob 133 of the tilt gimbal 130 exposed to the lower portion of the camera main body 100 is rotated and the elastic block 131 is raised after adjusting the tilting angle of the tilt camera module 120 supported by the camera main body 100 to be vertically tilted on the basis of the image information provided through the external monitor, the tilt camera module 120 may be fixed.

In addition, the parking guidance light 200 is bound to the camera main body 100 by the safety wire 180 and connected to the camera main body 100 by the connector 210. In this case, the parking guidance light 200 may be connected to the camera main body 100 in a state of being engaged with the camera main body 100 by the safety wire 180. Next, since the parking guidance light 200 is attached to the lower portion of the camera main body 100 by the magnetic force in a state in which the fixing knobs 133 and 153 are covered, installing the parking guidance camera apparatus is completed.

According to the present disclosure, since a pan tilt camera module having a pan angle and a tilting angle are adjusted can be easily fixed to or released from the outside of a main body housing by a fixing knob of a pan tilt gimbal without disassembling the main body housing of a camera main body, installation convenience can be improved. According to the present disclosure, since the fixing knob of the pan tilt gimbal is covered and concealed by a parking guidance light attachable to or detachable from the camera main body after the pan angle and the tilting angle of the pan tilt camera module are adjusted, an exterior appearance thereof can be enhanced.

Although the present disclosure is described with reference to embodiments shown in the accompanying drawings, the above descriptions are only exemplary embodiments, and it should be understood by those skilled in the art that various changes and other equivalent embodiments may be made from the above descriptions. Accordingly, the scope of the present disclosure should be defined by the scope of the claims and their equivalents.

What is claimed is:

1. A parking guidance camera apparatus comprising:
   a camera main body including a main body housing, a pan tilt camera module partially inserted into a camera mounting hole of the main body housing, a holder configured to support the pan tilt camera module on the main body housing so that the pan tilt camera module is laterally panned and vertically tilted, and a pan tilt gimbal configured to fix the pan tilt camera module in a state in which a panning angle and a tilting angle of the pan tilt camera module are adjusted;
   a parking guidance light detachably attached to a lower portion of the main body housing; and
   an installation bracket configured to install the camera main body at a set location in a parking lot,
   wherein the pan tilt gimbal includes an elastic pad configured to fix or release the pan tilt camera module as the elastic pad is in close contact with or separated from a lower surface of the pan tilt camera module in a state of facing the lower surface of the pan tilt camera module in the main body housing, an operation lever having an outer portion hinge-coupled to the holder to be vertically tilted in a state in which the elastic pad is seated on an upper surface of the outer portion in the main body housing, and a fixing knob having an upper portion screw-coupled to an inner portion of the operation lever to vertically tilt the operation lever according to a rotating direction thereof so that the elastic pad is in close contact or separated from the pan tilt camera module, and having a lower end portion covered by the parking guidance light in a state of being exposed to a lower portion of the main body housing,
   wherein the camera main body further includes at least one tilt camera module supported by the main body housing to be vertically tilted in a state of being partially inserted into a camera mounting hole of the main body housing, and a tilt gimbal configured to fix the tilt camera module in a state in which a tilting angle of the tilt camera module is adjusted, wherein the tilt gimbal includes an elastic block configured to fix or release the tilt camera module as the elastic block is in close contact with or separated from a lower surface of the tilt camera module in a state of facing the lower surface of the tilt camera module in the main body housing, an elevation block supported by the main body housing to be elevated in a state in which the elastic block is seated, and a fixing knob having an upper portion screw-coupled to the elevation block to elevate the elevation block according to a rotating direction thereof so that the elastic block is in close contact with or separated from the tilt camera module, and having a lower end portion covered by the parking guidance light in a state of being exposed to the lower portion of the main body housing.

2. The parking guidance camera apparatus of claim 1, wherein the parking guidance light is attached to the main body housing by a magnetic force.

3. The parking guidance camera apparatus of claim 1, wherein:
   the camera main body includes at least one ring on the main body housing; and
   the installation bracket includes a working cable engaged with the ring through a hook in one end thereof to hang and hold the camera main body.

4. The parking guidance camera apparatus of claim 1, further comprising a safety wire configured to bind the parking guidance light to the main body housing.

5. The parking guidance camera apparatus of claim 1, wherein the camera main body includes at least one monitor connection port exposed from a lower portion of the main body housing.

6. The parking guidance camera apparatus of claim 1, wherein:
   a pair of tilt camera modules are provided to be disposed at both sides of the main body housing; and
   a pair of tilt gimbals are provided to fix the tilt camera modules in a state in which a tilting angle of each of the tilt camera modules is adjusted.

* * * * *